(12) United States Patent
Berstis

(10) Patent No.: US 6,832,518 B1
(45) Date of Patent: *Dec. 21, 2004

(54) PRESSURE WAVE SENSOR USING LEVITATED MASS

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/607,487

(22) Filed: Jun. 26, 2003

Related U.S. Application Data

(63) Continuation-in-part of application No. 10/455,158, filed on Jun. 5, 2003.

(51) Int. Cl.[7] .......................... F16C 39/06; H02K 7/09; G01C 9/06
(52) U.S. Cl. ................................ 73/514.17; 73/514.19; 310/90.5; 33/345; 367/185; 381/177
(58) Field of Search .............. 73/570.5, 514.16–514.17, 73/514.31, 432.1, 382 R, 514.19; 310/90.5; 33/344–345; 367/185–186; 381/177

(56) References Cited

U.S. PATENT DOCUMENTS

| | | | | |
|---|---|---|---|---|
| 3,492,738 A | * | 2/1970 | Simon | 33/344 |
| 3,597,022 A | * | 8/1971 | Waldron | 310/90.5 |
| 3,626,364 A | * | 12/1971 | Simon et al. | 367/185 |
| 3,664,196 A | * | 5/1972 | Codina | 73/514.19 |
| 3,815,963 A | * | 6/1974 | Wilk | 310/90.5 |
| 3,831,287 A | * | 8/1974 | Sawdo et al. | 33/344 |
| 4,344,235 A | * | 8/1982 | Flanders | 33/366.12 |
| 4,573,356 A | | 3/1986 | Barmatz et al. | 73/570.5 |
| 4,736,815 A | * | 4/1988 | Barmatz et al. | 181/0.5 |
| 4,761,579 A | * | 8/1988 | Delassus | 310/90.5 |
| 5,168,183 A | | 12/1992 | Whitehead | 310/12 |
| 5,203,209 A | | 4/1993 | Watkins et al. | 73/570.5 |
| 5,396,136 A | * | 3/1995 | Pelrine | 310/90.5 |
| 5,684,616 A | * | 11/1997 | Brotz | 359/198 |
| 5,747,426 A | | 5/1998 | Abboud | 505/166 |
| 5,955,800 A | * | 9/1999 | Shearwood et al. | 310/40 MM |
| 6,465,739 B1 | | 10/2002 | Shepherd et al. | 174/125.1 |

OTHER PUBLICATIONS

"Diamagnetic Levitation" by Martin Simon, downloaded on May 28, 2003, from http://www.physics.ucla.edu/marty/diamag/index.html, 3 pages.

"How do Mircrophones Work, and Why Are There So Many Different Types", by How Stuff Works, downloaded on May 28, 2003 from http://www.howstuffworks.com/question309.htm, 3 pages.

* cited by examiner

Primary Examiner—Hezron Williams
Assistant Examiner—Rose M. Miller
(74) Attorney, Agent, or Firm—Robert H. Frantz; David A. Mims, Jr.

(57) ABSTRACT

A mass is levitated with respect to a base, at least one of which is comprised of a diamagnetic material, with the levitated mass also having a permanent magnetic property. A second permanent magnet is optionally configured such that it attracts the levitation mass away from the base to overcome gravitational force on the mass, thereby suspending the mass over the surface of the base. The mass is contained in a nonmagnetic, non-shielding and optionally optically-transparent housing so as to limit its excursion within a range of levitation positions. A position measurement means such as a laser interferometer, capacitance detector, or pickup coil is configured to measure positional deviations of the mass in response to incident pressure wave, the output of which being an electronic signal representing the pressure wave.

18 Claims, 10 Drawing Sheets

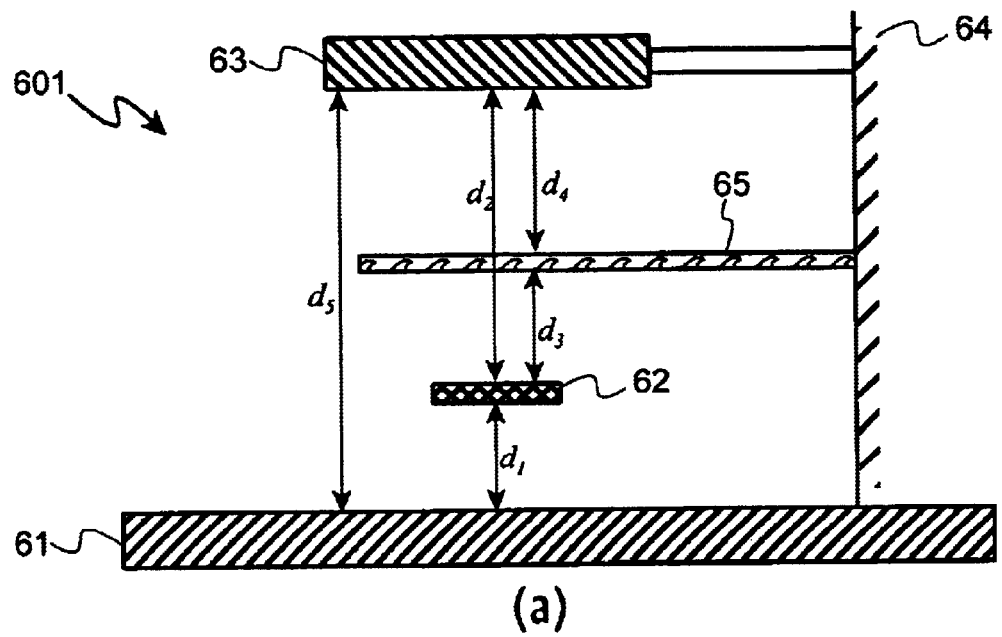
(a)
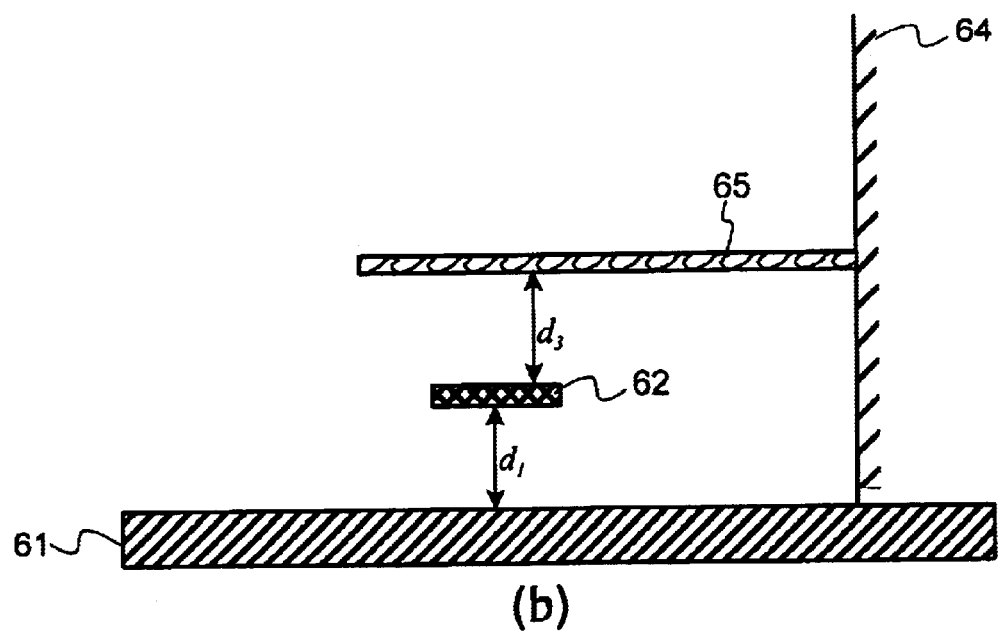
(b)
Fig. 4

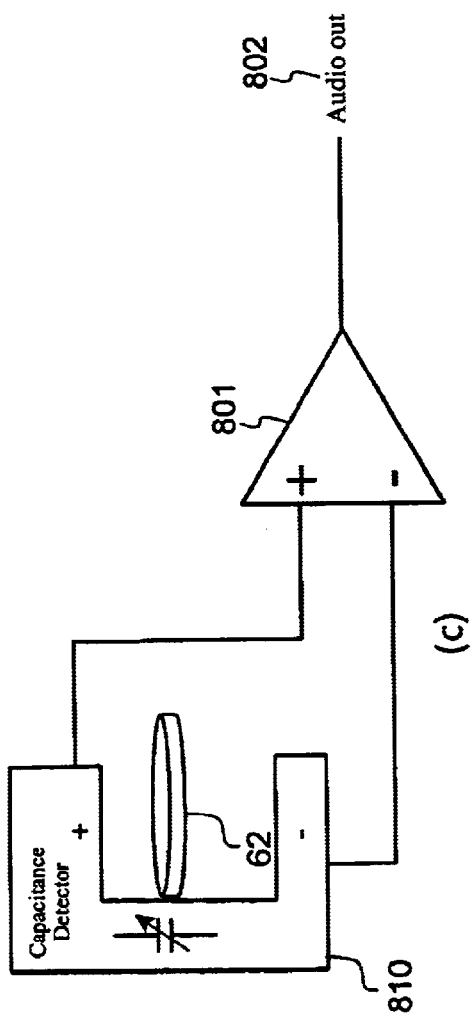
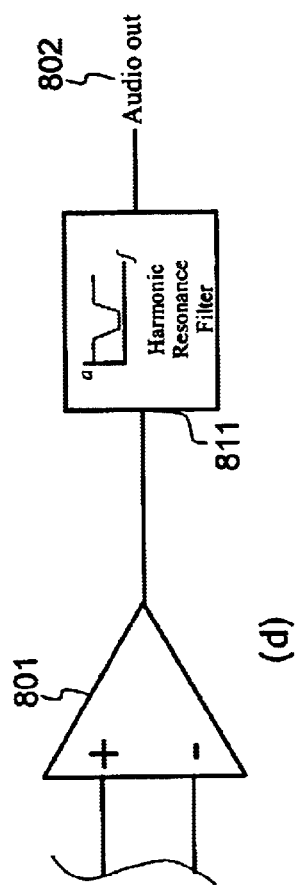
Fig. 8 (cont.)

PRESSURE WAVE SENSOR USING LEVITATED MASS

CROSS-REFERENCE TO RELATED APPLICATIONS (CLAIMING BENEFIT UNDER 35 U.S.C. 120)

This patent application is a continuation-in-part of, patent application Ser. No. 10/455,158, filed on Jun. 5, 2003, by Viktors Berstis.

INCORPORATION BY REFERENCE

The related patent application is related to, patent application Ser. No. 10/455,158, filed on Jun. 5, 2003, by Viktors Berstis, is hereby incorporated by reference in its entirety, including figures.

FEDERALLY SPONSORED RESEARCH AND DEVELOPMENT STATEMENT

This invention was not developed in conjunction with any Federally sponsored contract.

MICROFICHE APPENDIX

Not applicable.

BACKGROUND OF THE INVENTION

1. Field of the Invention

This invention relates to methods and devices for converting audio waves into electronic signals such as microphones, hydrophones, and sonic transducers.

2. Background of the Invention

Microphones are typically composed of a sensor element of some type which, when vibrated by incident sound or pressure waves, changes an electrical characteristic of the sensor element. For example, carbon microphones use a layer of carbon dust captured inside a flexible membrane. When the membrane is compressed or vibrated by sound waves, the electrical resistance through the carbon dust changes. By measuring the real time resistance of the dust (e.g. passing a current through the dust), an electrical signal which follows the sound signal is produced.

A "dynamic" microphone uses a coil surrounding a magnet, with the magnet suspended in the core of the coil by a flexible diaphragm. Incident sound waves on the diaphragm cause the magnet to move in the coil, which induces small amounts of electrical current into the coil. By amplifying these currents, an electrical signal which follows the sound signal is produced.

Yet another type of microphone is a "ribbon microphone" in which a thin suspended conductive ribbon is placed in a magnetic field. As sound waves cause the ribbon to vibrate, an electrical current is induced proportional to the sound.

Condenser microphones are a form of a capacitor. One plate of the capacitor is a flexible diaphragm, and the other plate is stationary. As sound incident on the diaphragm causes the distance between the plates to change, the capacitance can be measured to generate an electrical signal representative of the sound waves.

Piezoelectric crystal microphones use an arrangement in which a crystal receives the sound waves, flexing or bending the crystal which generates an electrical charge proportional to the changes in pressure due to the sound waves.

All of these forms of pressure wave sensors, however, share a common factor in that they suspend their sensor element using mechanical means, often with a thin sheet of plastic stretched tight across an opening or cavity, and they all depend on flexing or bending of the sensor element in response to incident pressure waves. The characteristics of the mechanical suspension method (e.g. film over a round opening, film over an oval opening, etc.), the physical characteristics of the suspension material itself (e.g. thickness and elasticity of the film) determine, and the physical and electrical characteristics of the sensor material during flexing or bending give rise to response non-linearities, complex resonance phenomena, and loss of efficiency in wave-to-signal conversion.

For example, given certain dimensions, shapes and material characteristics, a particular sensor may be useful for a range of audible frequencies from 400 Hz to 4 kHz, but may not be responsive or useful for frequencies below 400 Hz (e.g. seismic measurements) or above 4 kHz (e.g. music and ultrasound). And, this particular combination of materials and shapes will often have complex harmonic characteristics and multiple resonant frequencies.

Therefore, there is a need in the art for a pressure wave sensor which minimizes or avoids mechanical and material losses due to mechanical suspension means employed, and which exhibits deterministic resonance and harmonic characteristics.

BRIEF DESCRIPTION OF THE DRAWINGS

The following detailed description when taken in conjunction with the figures presented herein provide a complete disclosure of the invention.

FIG. 4 illustrates a structural configuration according to the present invention in which an upward-travel screen is employed to prevent the levitated mass from being attracted to and contacting with the top magnet.

SUMMARY OF THE INVENTION

Figure 1:
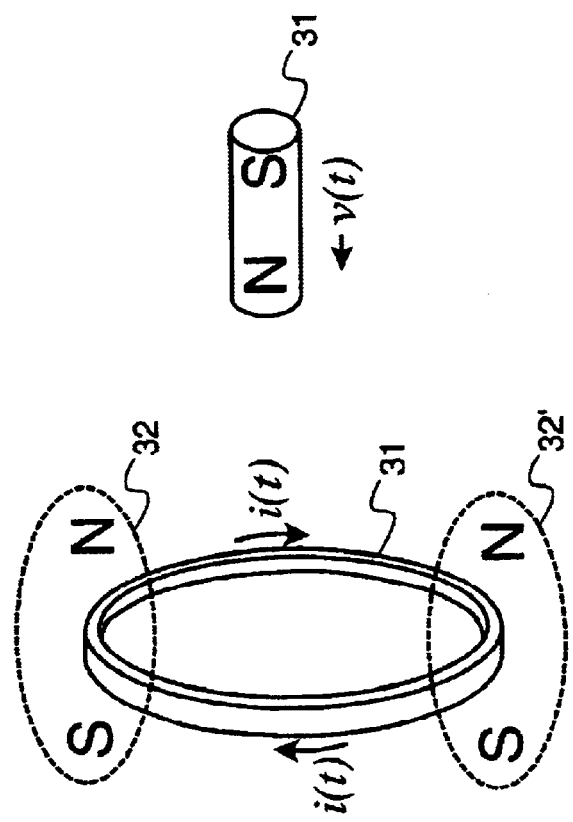
FIG. 1 shows an illustration for understanding of Lenz's law.

A small mass is levitated over a base according to one of several known configurations in which at least one of the base or the mass is made of a diamagnetic material. In a first configuration, the base contains a diamagnetic material, and the levitated mass is a standard "permanent" magnet. In this configuration, a second, upper permanent magnet is configured such that it attracts the levitation mass upwards and away from the base surface with sufficient magnetic force to overcome most of the gravitational force on the mass. The additional repulsive force from the diamagnetic base suspends the mass over the surface of the base.

In a more preferable embodiment, the mass to be levitated contains a diamagnetic material, and is preferably constructed in a very thin, light sheet. In this configuration, the base is constructed of one or more permanent magnets, and the upper magnet of the first configuration is not be required for levitation. In addition to eliminating the top magnet in this arrangement, this configuration is preferred as the thin sheet which is levitated provides a good mechanical sensor for pressure waves incident upon it. One or more magnets may be used in the base in order to form desired contours of magnetic field lines, as well.

The levitated mass is contained in a nonmagnetic, non-shielding and optionally optically-transparent housing so as to limit its excursion within a range of levitation positions. The enclosure has at least one portion of it for passing or transmitting pressure waves to the levitated mass, which causes the levitated mass to be momentarily displaced from a nominal or quiescent position in response to the pressure wave energy.

A position measurement means, such as a laser interferometer, capacitance detector, or pickup coil, is configured to measure positional deviations of the mass in response to an incident pressure wave, the output of which being an electronic signal representing the pressure wave. The electronic signal may be optionally amplified, recorded, digitized, or otherwise processed accordingly.

Thus, the invention provides a highly sensitive pressure wave sensor which does not use mechanical suspension means such as stretched diaphragms or films, and avoids complex resonance characteristics and nonlinearities in response.

DESCRIPTION OF THE INVENTION

A microphone is a form of a pressure wave sensor which is designed to detect acoustic waves in the human audible range, and to generate an electrical signal representative of those waves. In a broader sense, pressure wave sensors respond to a variety of physical phenomena, including acoustic waves in air, but also waves in fluids and solids, such as hydrophones, ultrasound transducers, etc.

For the purposes of this disclosure, we will refer to microphones as a specific embodiment option of the present invention, which may be readily realized in alternate forms for other types of pressure waves. Therefore, our presentation of a microphone embodiment is for illustration purposes only, and does not indicate that present invention is limited to such an embodiment and use.

The present invention utilizes, in part, a configuration disclosed in the related and incorporated patent application. The invention disclosed in the related patent application was a highly sensitive device for detecting minute changes in gravitational field strengths by using a levitated mass. The sensitivity of such a device also lends itself well to highly sensitive and highly responsive acoustic wave and pressure wave sensors, such as microphone elements, hydrophone elements, etc.

For completeness and ease of understanding of the present invention, we first present some of the details of the related invention, as these are incorporated into the present disclosure.

Levitating a Mass in Free Space

Magnetism, and more specifically repelling magnetic forces, have been employed to suspend small masses for various types of measurements, and especially gravimetric measurements. Magnetism can be divided into three types of magnetic behavior: diamagnetism, paramagnetism, and ferromagnetism.

Ferromagnetism is the type of magnetism most commonly employed in modern, daily life. It is the result of naturally aligned intrinsic spin axes of individual electrons of the atoms of the material. Lodestone, iron and magnetite are some of the common materials used to create "permanent magnets", as they exhibit their strong, dipolar magnetic properties under all conditions and temperatures, with or without the presence of other types of fields.

Initially, one who is unacquainted with magnetic theories may suspect that suspension or levitation of a small mass could be achieved using an arrangement of "permanent magnets", or ferromagnets. Earnshaw's theorem (Samuel Earnshaw, 1842) states that there is no stable configuration to levitate permanent magnets using static magnetic fields.

Some quasi-stable levitation arrangements have been achieved by spinning the levitated mass, in which gyroscopic moments offset the inherent instability of the forces otherwise exerted on the suspended mass. Unfortunately, the gyroscopic forces are also large enough to offset or obscure the effects of small forces, such as sound pressure waves, on the suspended mass. Additionally, energy must be induced into the spinning mass to keep it spinning over time, which may also obscure pressure wave measurements.

Diamagnetism may be viewed as an atomic version of Lenz's Law which provides that an electric current resulting from an applied magnetic field will be in a direction which sets up an opposing magnetic field. For example, if a dipole rod magnet (31) is passed or moved v(t) through an electrically conductive ring (30), a current i(t) will be induced in the ring in a direction which sets up a magnetic field (32, 32') which opposes the movement v(t) of the rod magnet, as shown in FIG. 1. This reactive current and opposing magnetic field is created regardless of the polarity of the inducing magnet.

All known elements are believed to exhibit some degree of diamagnetism. Most elements, however, do not exhibit noticeable or measurable diamagnetic properties. Under cryogenic conditions, such as 77 K, superconductive properties of some elements allow for substantial diamagnetic properties.

Figure 2:
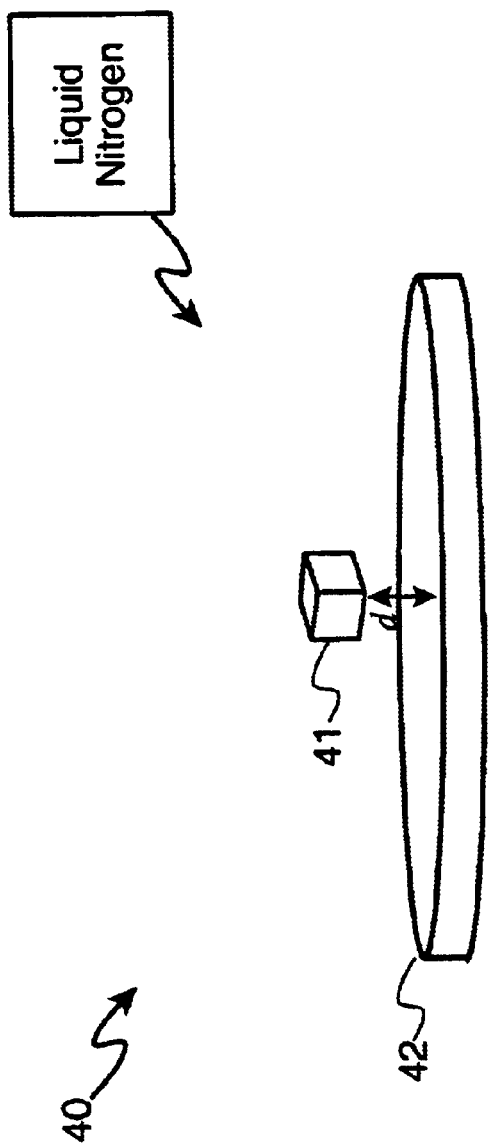
FIG. 2 depicts a levitated mass using diamagnetism at cryogenic temperatures.

Under such cryogenic conditions, Lenz's law can be applied to statically levitate a small magnetic mass above a strong diamagnetic material, taking advantage of the Meisner Effect in which movements of the levitated mass result in a reactive and opposing field to correct for the movements, thereby leaving it in a stable position suspended above the diamagnetic material without any means of mechanical support. For example, as shown in FIG. 2, a small magnetic mass (41), such as a Samarium Cobalt magnet, is levitated at a distance d above a superconductive diamagnetic material (42), such as a ceramic Yttrium compound, which is superconductive at temperatures such as 77 K.

Such a cryogenic, diamagnetic arrangement has been employed by some gravimetric measurement systems, as the force between the levitated mass and the diamagnetic base is highly stable and constant, thereby allowing any differences in displacement between the base and the levitated mass to be attributed to the tiny variations in gravitational field. A laser interferometer may be employed to accurately measure the position of the levitated mass.

This type of arrangement, however, is highly dependent on maintaining cryogenic conditions, which implies a need for a considerable supply of coolant such as liquid Nitrogen. Additionally, this type of system is difficult and expensive to operate due to the cryogenesis. Therefore, the invention disclosed in the related patent application addressed a need in the art for a system and method for gravimetric measurement which avoids the need for superconductive conditions, materials, and supplies.

As such, an arrangement was provided which allowed for stable or static levitation or suspension in free space of a permanent magnet at room temperature. It is available in two configurations, as described in the present Summary of the Invention. Our arrangement provides limited excursion of the levitated mass in an optically transparent housing so as to prevent the mass from being drawn into contact with an upper magnet (in one configuration), and to prevent the mass from sliding out of a stable position with respect to the upper magnet and the diamagnetic material, and to allow for optical or capacitive position and deflection measurement of the mass.

In the first available configuration of the present invention, a permanent magnet, such as a Neodymium-Boron-Iron magnet, is statically levitated over a block of diamagnetic material, such as pyrolytic graphite, using a second permanent magnet, such as a second Neodymium-Boron-Iron magnet, to reduce or offset most of the weight of the first magnet. Levitation of the first magnet is accomplished without any application of energy, and operates at room temperature without need for cryogenic conditions.

Figure 3:
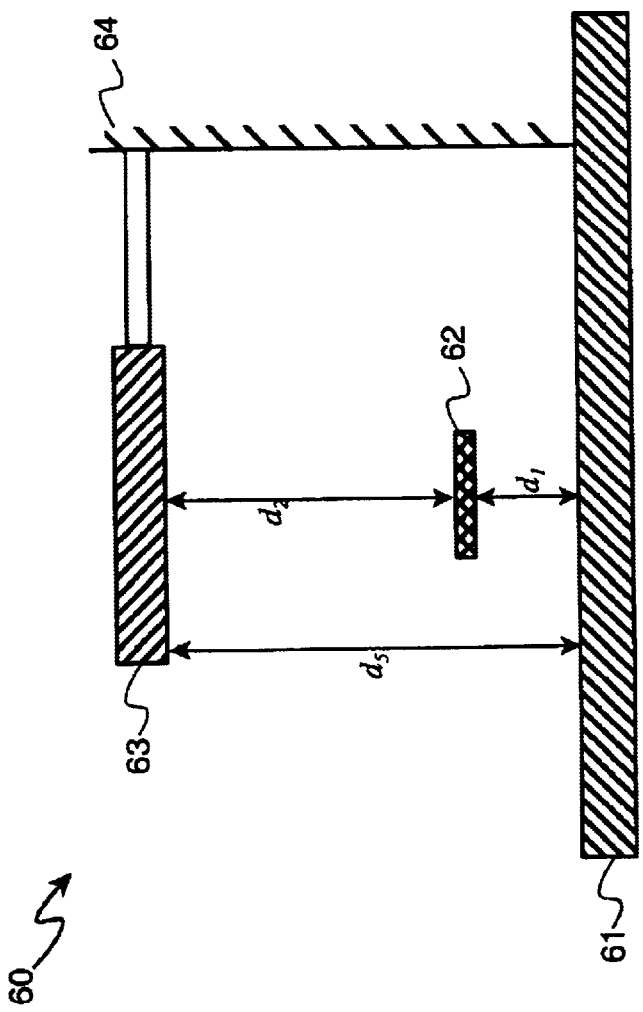
FIG. 3 depicts a known arrangement of permanent magnets and diamagnets which levitates a mass at room temperature.

Turning to FIG. 3, one such arrangement and device of the present invention employs a known arrangement (60) comprising a block (61) or base constructed of any suitable form of carbon which exhibits diamagnetic properties, and particularly graphite or pyrolytic graphite. Bismuth is known to have similar diamagnetic properties. Positioned above the block (61) is a permanent magnet of any sort, but preferably of a Neodymium-Boron-Iron compound, because they make the most powerful permanent magnets known to date.

Figure 6:
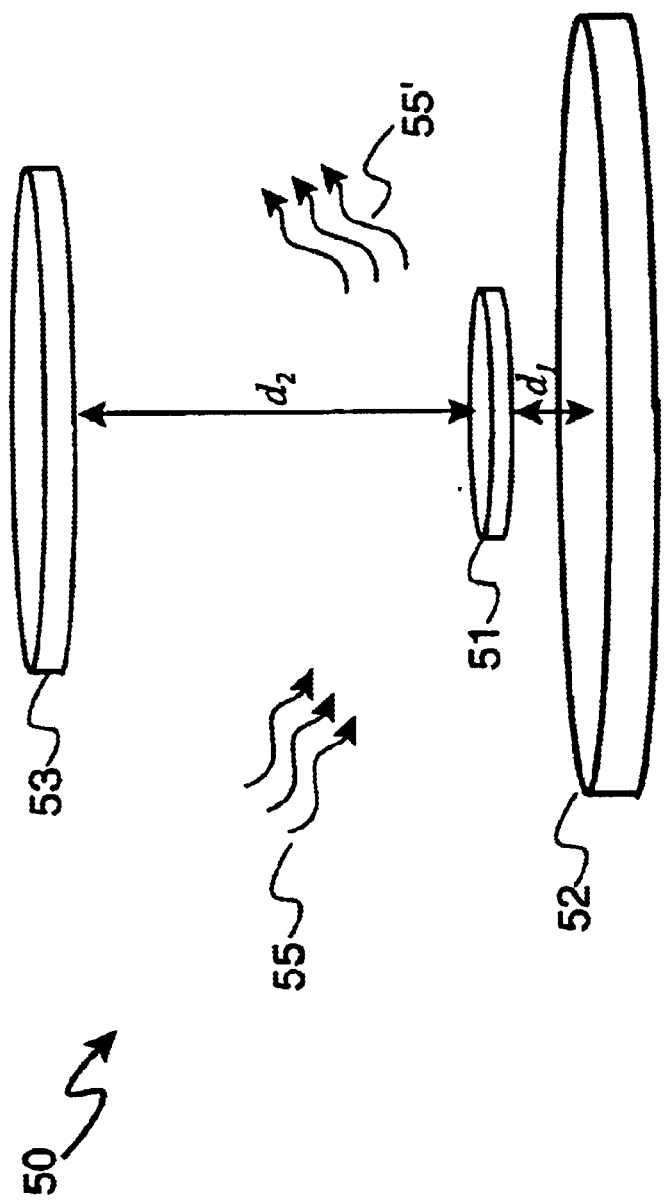
FIG. 6 illustrates a measurement device embodiment of the present invention.

In a second and preferable configuration of the present invention shown in FIG. 6, the top magnet (53) is optionally eliminated by constructing the base (52) of one or more permanent magnets, and producing the levitation mass (51) of a thin sheet of diamagnetic material, such as carbon. The levitation mass is preferrably provided with a more reflective coating such as a metal plating or paint to allow for reflective measurement of the position or movement of the mass. For some mass materials, painting or plating may not be necessary as its surface may naturally be reflective enough for our purposes. Offsets and changes in the distance between the levitated permanent magnet are measured using non-intrusive mechanisms such as a laser interferometer.

In either arrangement, the diamagnetic repulsion forces are used to stabilize the configuration at non-cryogenic temperatures (e.g. room temperature).

Returning to FIG. 3, a second permanent magnet (63) such as a Neodymium-based magnet is statically (64) mounted above the base (61) such that the levitation mass (62) is disposed between the top magnet (63) and the base magnet (61). This second permanent magnet (63) is rigidly affixed (64) at a distance $d_5$ from the base (61), and is used to attract the suspended mass (62) upwards and away from the base (61), thereby offsetting most of the actual weight of the suspended mass (62). In this arrangement, the diamagnetic forces are the stabilizing forces, and the attractive forces between the top permanent magnet (63) and the levitated mass provide the bulk of the lifting force.

Although this known arrangement (60) is effective for experiments and theorem demonstration, it is susceptible to the levitated mass (62) sliding out of a stable position from side-to-side, or being drawn into contact with the top magnet (63) as the result of mechanical vibration or jolting of the configuration.

Turning to FIG. 4, one aspect of the present invention is illustrated, in which a upper limit screen (65) is placed between the top magnet (63) and the levitated mass (62) (or above the levitated mass if no top magnet is employed). As shown in this configuration (601), the top magnet (63) attracts the levitated mass (62) to reduce its weight so that the diamagnetism of the carbon is sufficient to stabilize the levitation. It is desirable to have the top magnet (63) as powerful as possible so that its field lines are as close to parallel as possible in the vicinity of the levitating mass, thereby allowing the size of the region of stable levitation to be maximized.

However, if the levitated mass (62) is raised to an increased distance $d_1$ above the base (61), the top magnet (63) will overpower the gravitational force on the mass (62), and will attract the levitated mass to it due to the decreased distance $d_2$, immobilizing the levitated mass.

As such, we disposed a screen (65) comprised of a nonmagnetic, non-shielding and preferably optically transparent material above the levitated mass (62) and below the top magnet (63) to limit the maximum excursion distance $d_1+d_2$ of the mass (62) from the base (61) (e.g. to set a minimum distance $d_2$ between the mass and the top magnet). This keeps the mass from "flying" to the top magnet when disturbed by vibration or movement. The distances $d_1$, $d_2$, $d_3$, $d_4$, and $d_5$ may be determined empirically or by experiment based upon the mass and strength of the mass to be levitated (62), the strength of the top magnet (63), and the strength of the base material (61).

Figure 5:
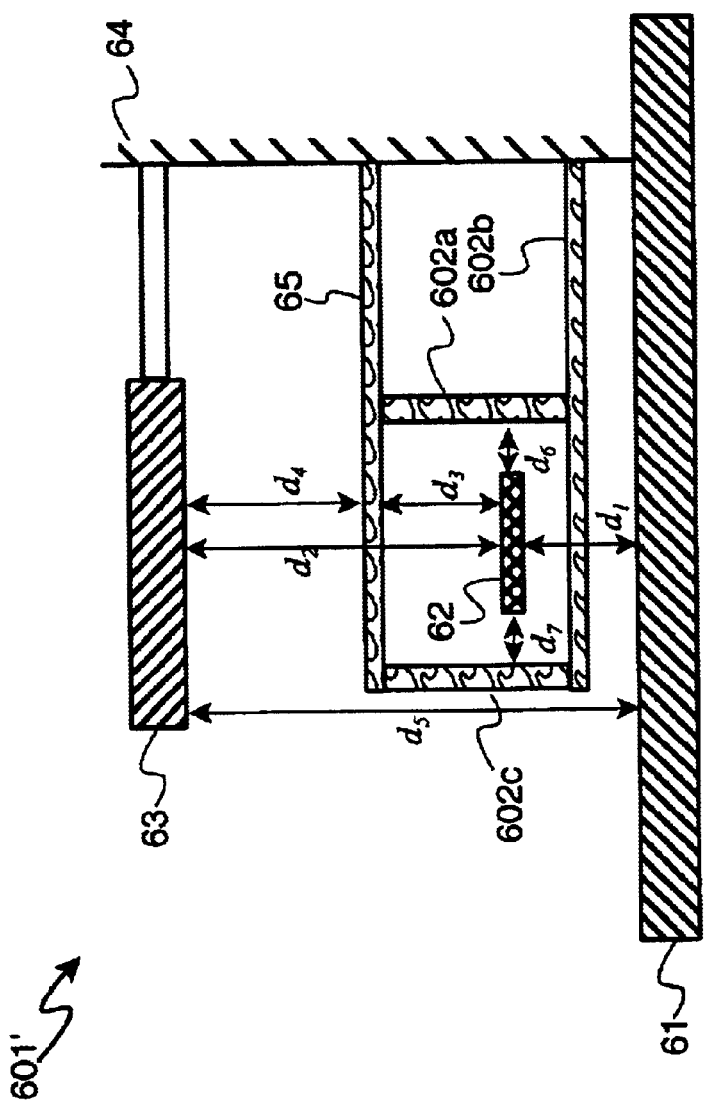
FIG. 5 shows a structural arrangement of the present invention in which the levitated mass is encapsulated in a housing for further excursion limitation.

Further, according to another aspect of our invention and as shown in FIG. 5, the levitated mass (62) is encased by a bottom (602b) and two sides (602a, 602c). The sides provide a means to prevent the mass from traveling too far in a side-to-side motion ($d_6$, $d_7$) such that it is maintained in a stable position relative to the base and the top magnet. The bottom (602b) forms an enclosure which around the mass (62). The sides (602a, 602c) and bottom (602b) may optionally be constructed of optically transparent material, and preferrably are nonmagnetic, non-shielding, as well. Additionally, at least one side or portion of the encasement is transparent to the pressure waves of interest, such as being acoustically transparent for a microphone embodiment. A plastic screen is a preferred material for these components, but other suitable materials may be employed.

The structure and device of FIG. 5 is useful to realize a levitated-mass pressure wave sensor which operates at temperatures including and beyond cryogenic or superconductive conditions. While there is no reason the device will not work well at cryogenic temperatures, it has also been demonstrated to work well at room temperature.

As shown in FIG. 6, the distance $d_1$ between the base (52) and the levitated mass (51) can be measured using a non-intrusive means such as a laser interferometer (55, 55') or capacitance detector, with the mass (51) suspended between a top magnet (53) which is rigidly affixed with respect to the base (52). A screen and enclosure, previously described but not shown in this figure, are also employed to set a minimum distance $d_2$ achievable between the mass (51) and the top magnet (53) to prevent "fly up", and to prevent sideways excursions of the levitated mass.

If a laser interferometer is used for position and deviation measurements, the screen, sides, and bottom of the enclosure should be constructed appropriately of transparent material at the wavelength of the laser. If a capacitance detector is employed, electrode plates should be placed either above or below the levitated mass such that the mass forms a capacitor plate with varying distance to the two electrode plates forming two series-connected capacitors. As pressure wave forces are placed on the levitated mass (51), the levitated mass is displaced by distance $\Delta d_1$, which is measured to obtain the time varying pressure wave signal being detected.

Figure 7:
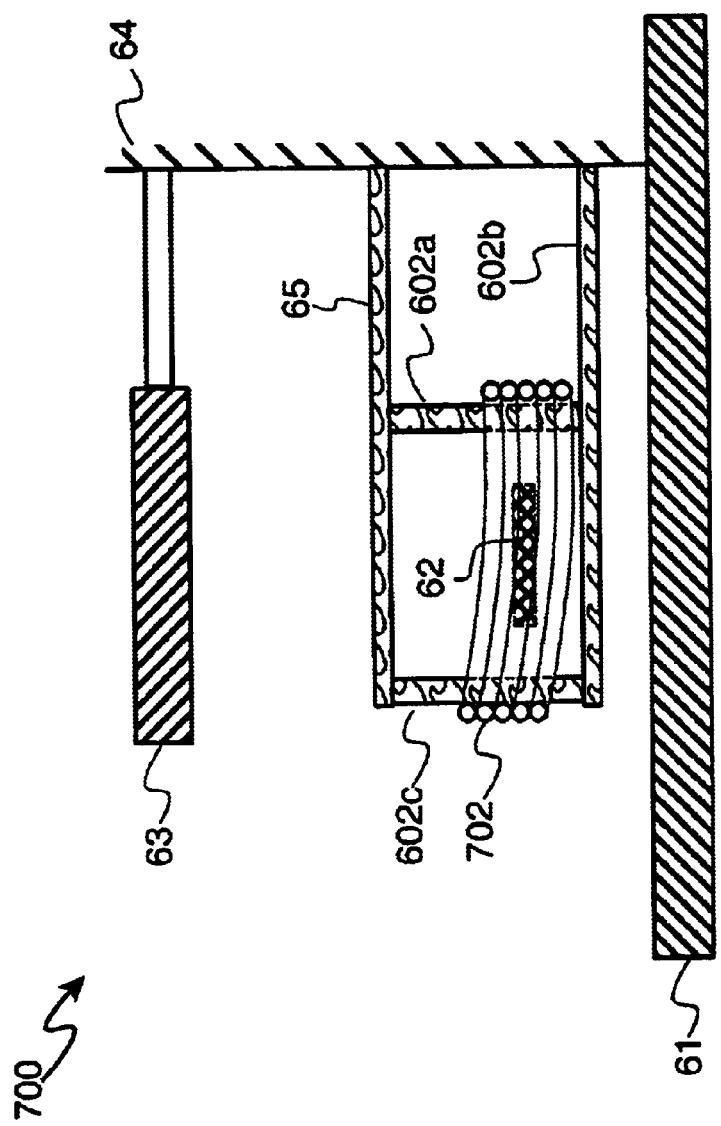
FIG. 7 illustrates a microphone element configuration according to the present invention.

Turning to FIG. 7, one possible embodiment (700) of our inventive microphone element includes the suspended mass (62), enclosure (65, 602a, 602b, 602c), base (61), and optional upper magnet (63) as previously described. A voice coil or "pickup coil" (702) is disposed circumferentially around the levitated mass (62).

In this configuration, the sides of the enclosure (602a, 602c) should be of non-metallic, non-shielding material such as plastic or glass, but not necessarily optically transparent, as the coil (702) will perform the function of generating a signal representative of the movements of the levitate mass (62).

Additionally, at least a portion of the enclosure around the levitated mass should be "transparent" to the pressure waves of interest, such as providing holes, slots or a screen through which acoustic waves may pass and strike the levitated mass (62). An alternate embodiment may include a rigid membrane as a portion of the levitated mass (62) which vibrates in response to external incident pressure waves.

As the levitated mass (62) is moved or vibrated in response to incident pressure waves on the assembly, it moves within the coil (702), which generates a varying electrical current in the coil. This current can then be used similarly to the current presented by a dynamic microphone.

Figure 8:
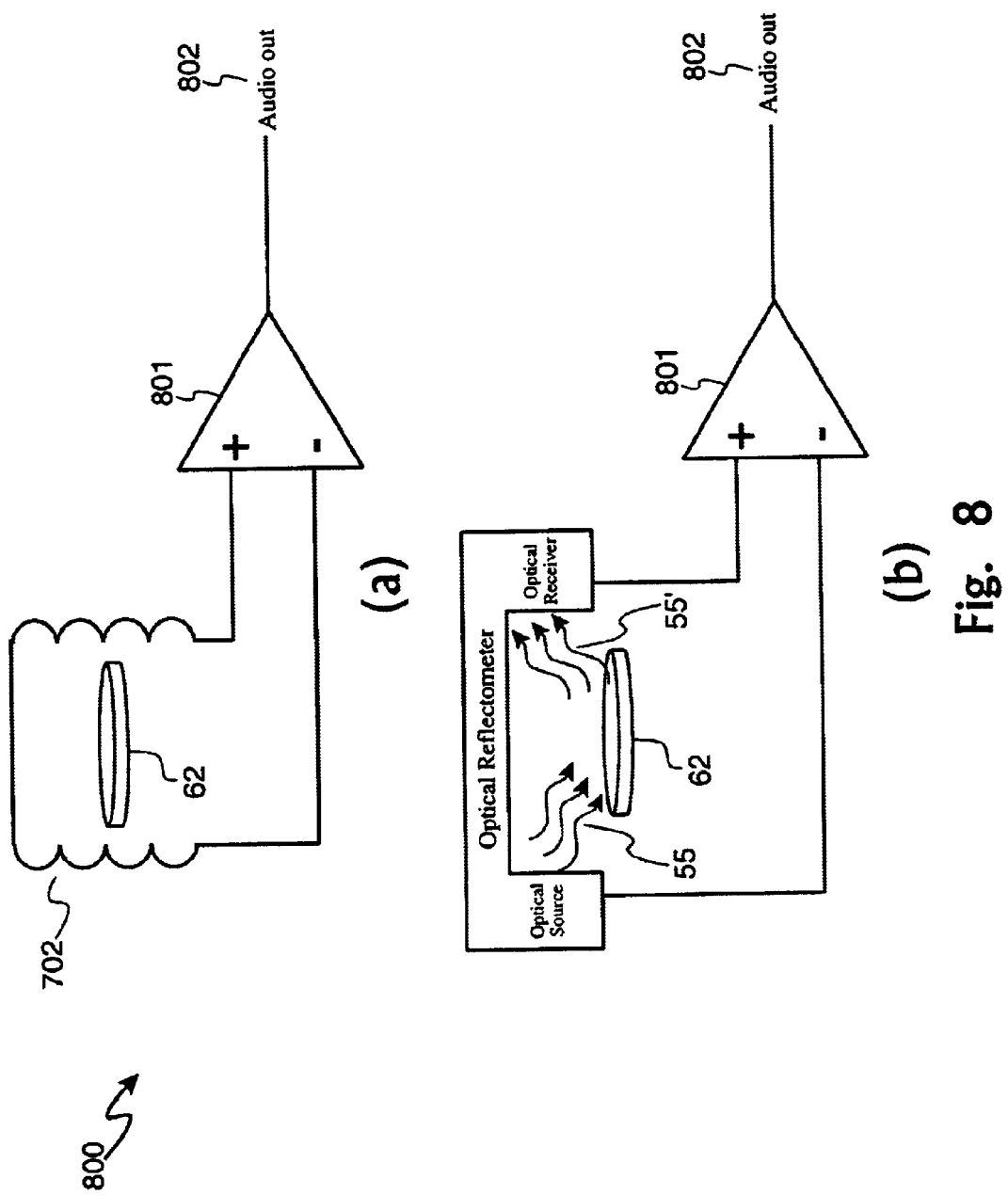
FIGS. 8a–8e provide functional block diagrams according to optional embodiments for a microphone element according to the present invention.
Figure 8:
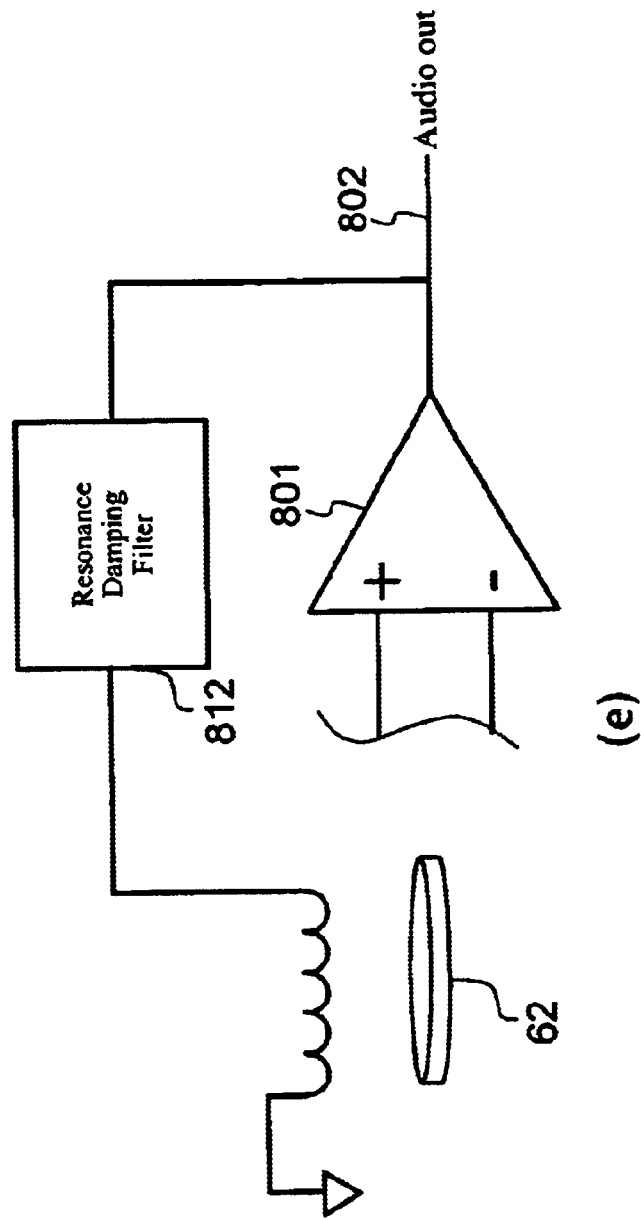

Turning to FIG. 8 alternate embodiments of the present invention are shown. The first, FIG. 8a, shows from a block diagram level the amplification (801) of the current produced by the coil (702) and the levitated mass (62), as discussed in detail with respect to FIG. 7, to produce an audio signal (802).

The second, FIG. 8b, shows from a block diagram level the amplification (801) of the current produced by a laser interferometer (55, 55') and the levitated mass (62), as discussed in detail with respect to FIG. 6. In this configuration, the enclosure should be optically transparent at least for the portions through which the laser is shown and reflected.

In practice, we have found that the levitated mass (62) may exhibit, in some configurations and shapes, a harmonic oscillation, likely due to lack of sufficient damping mechanism in the device. The exhibited harmonic characteristics, however, were simple in nature such as a single frequency sinusoidal resonance, instead of the complex, multifrequency resonance of the other sensors known in the art. The simple resonance characteristic of our arrangement is due to the fact that our arrangement contains rigid bodies in free-space suspension, rather than mechanically suspended bodies which are being flexed and bent.

Our harmonic and resonance problems are more readily and deterministically overcome by electronic filtering (811) the signal for the particular resonant frequency if the frequency is not in the band of interest, as shown in FIG. 8d. An alternative solution for removing the harmonic oscillation of our configuration is by incorporating a feedback mechanism (812) which detects ringing or harmonic oscillation, and when detected, applies a damping electromagnetic field substantially out of phase with the ringing, effectively dampening and eliminating the resonant vibration, as shown in FIG. 8e. This is a worthy tradeoff, given the extreme sensitivity of the sensor element in this configuration.

With further respect to sensitivity of the sensor, use of a pickup coil with a high number of turns (e.g. much greater than 20 turns) is effective, with an alternate embodiment using a capacitance detector (810), as shown in FIG. 8c, or laser interferometer being the most sensitive configuration.

In one prototype configuration, a light sensor that converts changes in light intensity to sound via a photo transistor to operational amplifier ("op amp"), driving a set of earphones, was constructed. A very thin and reflective sheet of stainless steel (approximately 0.001 inch thick) was placed on the floating magnet. A laser light was configured to shine at an angle onto the steel in a manner such that the reflection was picked up with the light sensor. When a person spoke in the direction of the levitated mass, the sound was accurately transduced to an electrical signal and reproduced in the headphones. The natural resonant frequency of the floating mass and steel sheet, in this configuration, did not adversely affect its ability to pick up the audio waves from the speaking person.

In alternate or enhanced configurations, there are many configurations available which might be useful for detecting pressure waves of varying types (e.g. hydrophonic waves, ultrasound waves, seismic vibrations, etc.). For example, the floating magnet could be configured with a diaphragm, with a "membrane" on center or off center. Or, a thin slice of carbon could be levitated over magnets instead of levitating a magnet over carbon. Additionally, painting or plating the levitated mass with a more reflective material can enhance laser reflection for improved signal conversion.

Conclusion

A configuration for producing a highly sensitive device for measuring or transducing pressure waves has been disclosed. Specific configurations for a microphone element have been presented for illustrative purposes. Those skilled in the art, however, will readily recognize that many variations, substitutions, and alternate embodiments may be made from these example embodiments without departing from the spirit and scope of the present invention. Therefore, the scope of the present invention should be ascertained by the following claims.

What is claimed is:

1. A pressure wave sensor comprising:
    a base and a mass to be levitated, at least one of which is comprised of a material having a diamagnetic property and forming a first permanent magnet, said base having at least one surface, said levitation mass being configured on or near said base surface such that it is levitated in a quiescent position with respect to the base and such that a pressure wave incident on said levitation mass displaces the mass from said quiescent position;
    an upward excursion limitation screen disposed opposite of said levitation mass from said base in a configuration so as to prevent the levitation mass from moving too far from said base or out of range of detectable displacement; and
    a signal detector configured to generate an electronic signal in response to displacement of said mass due to incident pressure waves.

2. The system as set forth in claim 1 wherein said signal detector is a laser interferometer.

3. The system as set forth in claim 1 wherein said signal detector is a capacitance detector.

4. The system as set forth in claim 1 wherein said signal detector is a pickup coil disposed circumferentially about said levitated mass.

5. The system as set forth in claim 1 wherein said levitated mass and signal generator are configured to transduce acoustic waves into electronic signals.

6. The system as set forth in claim 1 wherein said levitated mass and signal generator are configured to transduce hydrophonic waves into electronic signals.

7. The system as set forth in claim 1 wherein said levitated mass and signal generator are configured to transduce inaudible pressure waves into electronic signals.

8. The system as set forth in claim 1 wherein said levitated mass and signal generator are configured to transduce seismic waves into electronic signals.

9. The system as set forth in claim 1 further comprising a harmonic resonance filter for suppressing artifacts of resonance of said levitated mass.

10. The system as set forth in claim 1 further comprising a resonance damper for electro-magnetically inducing movement into said mass to cancel resonance of said mass.

11. The system as set forth in claim 1 further comprising an enclosure configured around the sides and beneath said levitation mass in order to limit side-to-side excursions of said levitation mass.

12. The system as set forth in claim 1 wherein said levitation mass is constructed of a material comprising a diamagnetic element selected from the group of diamagnetic carbon, graphite, pyrolytic graphite, and Bismuth.

13. The system as set forth in claim 1 wherein said levitation mass is constructed of a material comprising a ferromagnetic element selected from the group of Lodestone, iron, magnetite, Neodymium-Boron-Iron, Samarium Cobalt.

14. The system as set forth in claim 1 wherein said base is constructed of a material comprising a diamagnetic element selected from the group of diamagnetic carbon, graphite, pyrolytic graphite, and Bismuth.

15. The system as set forth in claim 1 wherein said base is constructed of a material comprising a ferromagnetic element selected from the group of Lodestone, iron, magnetite, Neodymium-Boron-Iron, Samarium Cobalt.

16. The system as set forth in claim 1 further comprising a second permanent magnet configured juxtapositioned to said base surface such that said upward excursion limitation screen is disposed between said second permanent magnet and said levitation mass, and where said levitated mass has a permanent magnetic property, such that the second magnet attracts the mass away from said base surface with sufficient magnetic force to overcome gravitational force on the mass such that the levitation mass is suspended away from said base surface at said quiescent position.

17. The system as set forth in claim 16 wherein said second permanent magnet is constructed of a material comprising a ferromagnetic element selected from the group of Lodestone, iron, magnetite, Neodymium-Boron-Iron, Samarium Cobalt.

18. The system as set forth in claim 1 wherein said signal detector comprises a light source configured to reflect across said levitated mass onto a light intensity detector.

* * * * *